United States Patent
Dickerman et al.

(10) Patent No.: US 7,792,847 B2
(45) Date of Patent: Sep. 7, 2010

(54) CONVERTING STRUCTURED REPORTS TO FORMULAS

(75) Inventors: Howard J. Dickerman, Bellevue, WA (US); Kaicheng Hu, Bellevue, WA (US); Robert G. Hawking, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 11/268,048

(22) Filed: Nov. 7, 2005

(65) Prior Publication Data

US 2007/0061344 A1    Mar. 15, 2007

Related U.S. Application Data

(60) Provisional application No. 60/715,661, filed on Sep. 9, 2005.

(51) Int. Cl.
   *G06F 7/00* (2006.01)
   *G06F 17/30* (2006.01)

(52) U.S. Cl. .................................. 707/756; 707/957

(58) Field of Classification Search .............. 707/101, 707/103 R, 705, 736, 756, 957; 715/214
   See application file for complete search history.

(56) References Cited

U.S. PATENT DOCUMENTS

| | | | |
|---|---|---|---|
| 5,175,810 A | 12/1992 | Young et al. | 715/217 |
| 5,280,575 A | 1/1994 | Young et al. | 715/255 |
| 5,845,300 A | 12/1998 | Comer et al. | 715/203 |
| 5,874,955 A | 2/1999 | Rogowitz et al. | 345/589 |
| 6,317,750 B1 * | 11/2001 | Tortolani et al. | 707/103 R |
| 6,377,965 B1 | 4/2002 | Hachamovitch et al. | 715/203 |
| 6,460,059 B1 | 10/2002 | Wisniewski | 715/212 |
| 6,564,213 B1 | 5/2003 | Ortega et al. | 707/5 |
| 6,626,959 B1 | 9/2003 | Moise et al. | 715/522 |
| 6,631,497 B1 | 10/2003 | Jamshidi et al. | 715/205 |
| 6,640,234 B1 | 10/2003 | Coffen et al. | 715/219 |
| 6,728,724 B1 | 4/2004 | Megiddo et al. | 707/102 |
| 6,757,867 B2 | 6/2004 | Bauchot et al. | 715/220 |

(Continued)

FOREIGN PATENT DOCUMENTS

| | | |
|---|---|---|
| KR | 10-0289065 | 5/1999 |
| WO | WO 03/088063 A1 | 10/2003 |

OTHER PUBLICATIONS

"Tutorial 26: MSAS: Office 2000 OLAP Components", http://www.exforsys.com/content/view/1349, last accessed Sep. 8, 2005, 7 pgs.

(Continued)

*Primary Examiner*—James Trujillo
*Assistant Examiner*—Marc Somers
(74) *Attorney, Agent, or Firm*—Merchant & Gould, P.C.

(57) ABSTRACT

Data corresponding to a structured report or multi-dimensional presentation is converted to formulas within cells of a spreadsheet. The cell formulas operate on a multi-dimension database that was the data source for the structured report. Therefore the layout of the data in the cells is similar to the layout of the data in structured report. The user is able to move the formulas around in the spreadsheet resulting in any custom layout the user desires. Because the data is no longer in a structured report, it is no longer subject to the layout restrictions of the report.

15 Claims, 7 Drawing Sheets

U.S. PATENT DOCUMENTS

| | | | |
|---|---|---|---|
| 6,829,607 B1 | 12/2004 | Tafoya et al. | 707/6 |
| 6,907,428 B2* | 6/2005 | Fitzpatrick et al. | 707/10 |
| 7,043,476 B2 | 5/2006 | Robson | 707/7 |
| 7,324,991 B1 | 1/2008 | Anjur | 707/5 |
| 7,337,163 B1 | 2/2008 | Srinivasan et al. | 707/3 |
| 7,415,481 B2 | 8/2008 | Becker et al. | 707/102 |
| 7,693,860 B2 | 4/2010 | Babanov et al. | 715/212 |
| 2002/0013786 A1* | 1/2002 | Machalek | 707/503 |
| 2002/0046131 A1 | 4/2002 | Boone et al. | 705/26 |
| 2002/0184260 A1* | 12/2002 | Martin et al. | 707/503 |
| 2002/0194217 A1 | 12/2002 | Hoffman et al. | 707/503 |
| 2003/0009649 A1 | 1/2003 | Martin et al. | 712/1 |
| 2003/0026143 A1 | 2/2003 | Brennan | 365/200 |
| 2003/0033288 A1 | 2/2003 | Shanahan et al. | 707/3 |
| 2003/0055832 A1 | 3/2003 | Rocaforte | 707/100 |
| 2003/0055843 A1 | 3/2003 | Chiu | 707/104.1 |
| 2004/0237029 A1 | 11/2004 | Medicke et al. | 715/503 |
| 2005/0010565 A1 | 1/2005 | Cushing et al. | 707/3 |
| 2005/0027750 A1 | 2/2005 | Martin et al. | 707/200 |
| 2005/0091206 A1* | 4/2005 | Koukerdjinian et al. | 707/3 |
| 2005/0165754 A1 | 7/2005 | Valliappan et al. | 707/3 |
| 2005/0165825 A1 | 7/2005 | Turski et al. | 707/102 |
| 2005/0183002 A1 | 8/2005 | Chapus | 715/505 |
| 2005/0184260 A1* | 8/2005 | Fageraas et al. | 250/573 |
| 2005/0223027 A1 | 10/2005 | Lawrence et al. | 707/103 R |
| 2005/0223061 A1 | 10/2005 | Auerbach et al. | 709/206 |
| 2006/0010367 A1 | 1/2006 | Sattler et al. | 715/503 |
| 2006/0015805 A1 | 1/2006 | Humenansky et al. | 715/503 |
| 2006/0107196 A1* | 5/2006 | Thanu et al. | 715/503 |
| 2006/0129598 A1 | 6/2006 | Anjur et al. | 707/102 |
| 2006/0129929 A1 | 6/2006 | Weber et al. | 715/538 |
| 2006/0212469 A1 | 9/2006 | Babanov et al. | 707/102 |
| 2006/0293944 A1 | 12/2006 | Igelbrink et al. | 705/9 |
| 2007/0027876 A1 | 2/2007 | Graf | 707/10 |
| 2007/0027904 A1 | 2/2007 | Chow et al. | 707/102 |
| 2007/0055922 A1 | 3/2007 | Martynov et al. | 715/210 |
| 2007/0088691 A1 | 4/2007 | Dickerman et al. | 707/5 |
| 2007/0168323 A1 | 7/2007 | Dickerman et al. | 707/2 |
| 2007/0208721 A1 | 9/2007 | Zaman et al. | 707/4 |
| 2007/0219956 A1 | 9/2007 | Milton | 707/3 |
| 2008/0294612 A1* | 11/2008 | Wiles | 707/4 |

OTHER PUBLICATIONS

"What is XLCubed Explorer", http://www.xlcubed.com/explorer.htm, last accessed Sep. 8, 2005, 2 pgs.

"Excel Simplicity. Advanced OLAP Capabilities. Web Enabled.", http://paristech.com/index2.html, Sep. 8, 2005, 3 pgs.

"SPSS Base", http://www.spss-sa.com/products/body.htm, last accessed Sep. 8, 2005, 12 pgs.

Office Action mailed Aug. 23, 2007, in U.S. Appl. No. 11/083,492, 12 pgs.

Office Action mailed Jul. 24, 2008, in U.S. Appl. No. 11/083,492, 16 pgs.

Office Action mailed Jan. 6, 2009, in U.S. Appl. No. 11/083,492, 17 pgs.

Office Action mailed Apr. 14, 2009, in U.S. Appl. No. 11/222,928, 17 pgs.

Final Office Action mailed Sep. 3, 2008, in U.S. Appl. No. 11/222,928, 15 pgs.

Office Action mailed Feb. 4, 2008, in U.S. Appl. No. 11/222,928, 13 pgs.

Office Action mailed Nov. 24, 2009, in U.S. Appl. No. 11/222,928, 17 pgs.

Office Action mailed Jan. 18, 2008, in U.S. Appl. No. 11/251,598, 17 pgs.

Final Office Action mailed Oct. 15, 2008, in U.S. Appl. No. 11/251,598, 13 pgs.

Office Action mailed Jul. 8, 2009, in U.S. Appl. No. 11/251,598, 15 pgs.

Office Action mailed Feb. 19, 2008, in U.S. Appl. No. 11/325,372, 14 pgs.

Final Office Action mailed Nov. 12, 2008, in U.S. Appl. No. 11/325,372, 10 pgs.

Office Action mailed Jul. 13, 2009, in U.S. Appl. No. 11/325,372, 13 pgs.

International Search Report mailed Feb. 26, 2007, in PCT/US2006/034987, 10 pgs.

International Search Report mailed Sep. 26, 2003, in PCT/IB03/01444, 1 pg.

Final Office Action mailed Feb. 1, 2010, in U.S. Appl. No. 11/325,372, 20 pgs.

Final Office Action mailed Feb. 19, 2010, in U.S. Appl. No. 11/251,598, 28 pgs.

Office Action mailed Apr. 26, 2010, in U.S. Appl. No. 11/222,928, 26 pgs.

* cited by examiner

Structured Report

| | A | B | C | D | E | F |
|---|---|---|---|---|---|---|
| 1 | Promotions | Price Winners ▼ | | | | |
| 2 | | | | | | |
| 3 | Store Sales | | | | | |
| 4 | | | | Year ▼ | Quarter | |
| 5 | Country ▼ | State Province ▼ | Product Family ▼ | ⊞ 1997 | | |
| 6 | ⊟ USA | ⊞ CA | ⊞ Drink | ⊞ Q2 | ⊞ Q3 | |
| 7 | | | ⊞ Drink | $ 77.31 | $ 118.12 | |
| 8 | | | ⊞ Food | $ 679.63 | $ 806.98 | |
| 9 | | ⊞ WA | ⊞ Non-Consumable | $ 196.66 | $ 180.50 | |
| 10 | | | ⊞ Drink | $ 53.78 | | |
| 11 | | | ⊞ Food | $ 598.93 | | |
| 12 | Grand Total | | ⊞ Non-Consumable | $ 143.30 | | |
| 13 | | | | $1,749.61 | $1,105.60 | |

*Fig. 5*

Spreadsheet

| | A | B | C | D | E |
|---|---|---|---|---|---|
| 1 | Promotions | Price Winners | | | |
| 2 | =CUBEMEMBER("Ads","[Measures].[Store Sales]") | | | | |
| 3 | | | | | |
| 4 | Country | State Province | Product Family | Year | Quarter |
| 5 | | | | =CUBEMEMBER("Ads","[Time].[1997]") | =CUBEMEMBER("Ads","[Time].[1997].[Q3]") |
| | =CUBEMEMBER("Ads","[Customers].[All Customers].[USA]") | =CUBEMEMBER("Ads","[Customers].[All Customers].[USA].[CA]") | =CUBEMEMBER("Ads",{"[Customers].[USA].[CA]","[Product].[All Products].[Drink]"}) | =CUBEMEMBER("Ads","[Time].[1997].[Q2]") | |
| 6 | | | =CUBEMEMBER("Ads",{"[Customers].[USA].[CA]","[Product].[All Products].[Food]"}) | =CUBEVALUE("Ads","$B$1,$A$3,$C6,$D$5) | =CUBEVALUE("Ads","$B$1,$A$3,$C6,$E$5) |
| 7 | | | =CUBEMEMBER("Ads",{"[Customers].[USA].[CA]","[Product].[All Products].[Non-Consumable]"}) | =CUBEVALUE("Ads","$B$1,$A$3,$C7,$D$5) | =CUBEVALUE("Ads","$B$1,$A$3,$C7,$E$5) |
| 8 | | =CUBEMEMBER("Ads","[Customers].[All Customers].[USA].[WA]") | =CUBEMEMBER("Ads",{"[Customers].[USA].[WA]","[Product].[All Products].[Drink]"}) | =CUBEVALUE("Ads","$B$1,$A$3,$C8,$D$5) | =CUBEVALUE("Ads","$B$1,$A$3,$C8,$E$5) |
| 9 | | | | =CUBEVALUE("Ads","$B$1,$A$3,$C9,$D$5) | =CUBEVALUE("Ads","$B$1,$A$3,$C9,$E$5) |
| 10 | | | =CUBEMEMBER("Ads",{"[Customers].[USA].[WA]","[Product].[All Products].[Food]"}) | =CUBEVALUE("Ads","$B$1,$A$3,$C10,$D$5) | =CUBEVALUE("Ads","$B$1,$A$3,$C10,$E$5) |
| 11 | | | =CUBEMEMBER("Ads",{"[Customers].[USA].[WA]","[Product].[All Products].[Non-Consumable]"}) | =CUBEVALUE("Ads","$B$1,$A$3,$C11,$D$5) | =CUBEVALUE("Ads","$B$1,$A$3,$C11,$E$5) |
| 12 | =CUBEMEMBER("Ads","[Customers].[All Customers]","Grand Total") | | | =CUBEVALUE("Ads","$B$1,$A$3,$A12,$D$5) | =CUBEVALUE("Ads","$B$1,$A$3,$A12,$E$5) |
| 13 | | | | | |

*Fig. 6*

Spreadsheet

| | A | B | C | D | E | F |
|---|---|---|---|---|---|---|
| 1 | Promotions | Price Winners ▾ | | | | |
| 2 | | | | | | |
| 3 | Store Sales | | | | | |
| 4 | | | | Year | Quarter | |
| 5 | Country | State Province | Product Family | 1997 | | |
| 6 | USA | CA | Drink | Q2 | Q3 | |
| 7 | | | Food | $ 77.31 | $ 118.12 | |
| 8 | | | Non-Consumable | $ 679.63 | $ 806.98 | |
| 9 | | WA | Drink | $ 196.66 | $ 180.50 | |
| 10 | | | Food | $ 53.78 | | |
| 11 | | | Non-Consumable | $ 598.93 | | |
| 12 | Grand Total | | | $ 143.30 | | |
| 13 | | | | $1,749.61 | $1,105.60 | |

CONVERTING STRUCTURED REPORTS TO FORMULAS

RELATED APPLICATION(S)

This utility patent application claims the benefit under 35 United States Code §119(e) of U.S. Provisional Patent Application No. 60/715,661 filed on Sep. 9, 2005, which is hereby incorporated by reference in its entirety.

BACKGROUND

Spreadsheet software or applications are relatively well-known and useful tools. Typical spreadsheet applications simulate physical spreadsheets by capturing, displaying, and manipulating data arranged in rows and columns. At the intersection of the columns and the rows are cells. Cells within spreadsheets can contain: a number, a string, an error value, a blank value, etc. Furthermore, cells may also contain formulas that can operate on data in other cells and display the results. These formulas empower the user to create calculations and business logic that helps the user exploit the data.

Another type of data presentation is provided by a Pivot-Table® style report developed by the MICROSOFT® CORPORATION of Redmond, Wash. A PivotTable® is a multi-dimensional presentation, or structured report, of the data that is included in a multi-dimensional database. These structured reports provide a user interface for viewing Online Analytical Processing (OLAP) data which are generally stored as multi-dimensional databases. OLAP services are an integral part of most data warehouse and business analysis systems. OLAP services provide for fast analysis of multidimensional information. For this purpose, OLAP services provide for multi-dimensional access and navigation of the data in an intuitive and natural way, providing a global view of data that can be "drilled down" into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In OLAP, information is viewed in a multi-dimensional report conceptually as "cubes". The cubes correspond to the multi-dimensional databases where the information is stored. Each multi-dimensional database may contain one or more cubes. Each cube is comprised of dimensions, levels, and measures. In this context, a dimension is a structural attribute of a cube that is a list of members of a similar type in the user's perception of the data. Typically, hierarchy levels are associated with each dimension. For example, a time dimension may have hierarchical levels consisting of days, weeks, months, and years, while a geography dimension may have levels of cities, states/provinces, and countries. Dimension members act as indices for identifying a particular cell or range of cells within a multi-dimensional array. Each cell contains a value, also referred to as a measure, or measurement.

Spreadsheets and their formulaic cells are different than the multi-dimensional presentations and their dimension members. Each of these data interfaces provide for advantages and disadvantages over the other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Data represented in a multi-dimensional or structured report is converted to formulas provided in a spreadsheet. Certain functions included in a spreadsheet enable users to fetch data from OLAP cubes and place that data into arbitrary cells in a spreadsheet application workbook. Functionality is included in the spreadsheet application to allow users to initially build a report using a structured report and then convert that report into a set of formulas. In accordance with one aspect, the formulas comprise of cube functions, or functions for retrieving and interacting with data of an OLAP database (frequently referred to as an OLAP cube). The user may use the structured report's field list to choose the categories of data to be included in the report, and then the user can use other report interactivity (pivoting, expand/collapse, etc.) to specify precisely what information should be in the report. Once the user finalizes the report, it may be converted to formulas in a spreadsheet comprising formulaic cells. The cell formulas operate on the OLAP cube directly, and therefore the layout of the data in the cells is similar to the layout of the data in structured report. The user is able to move the formulas around in the spreadsheet resulting in any custom layout the user desires. Because the data is no longer in a structured report, it is no longer subject to the layout restrictions of these types of reports.

A single command may be invoked to convert a structured report to independent worksheet cells that contain formulas. Those formulas substantially comprise cube functions. Although the discussion herein is related to multi-dimensional reports and spreadsheets, this conversion from data to formulas may be applied in other applications.

A report filter in the pivot table is retained with the presentation of the spreadsheet so that the report filter may interact with the other free standing formulas that are using the report filter as a data slicer or dimension member. Placement of metadata behind the report filter in the pivot table allows standalone functions of the spreadsheet to refer to the report filter as if the report filter also contained the functions.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
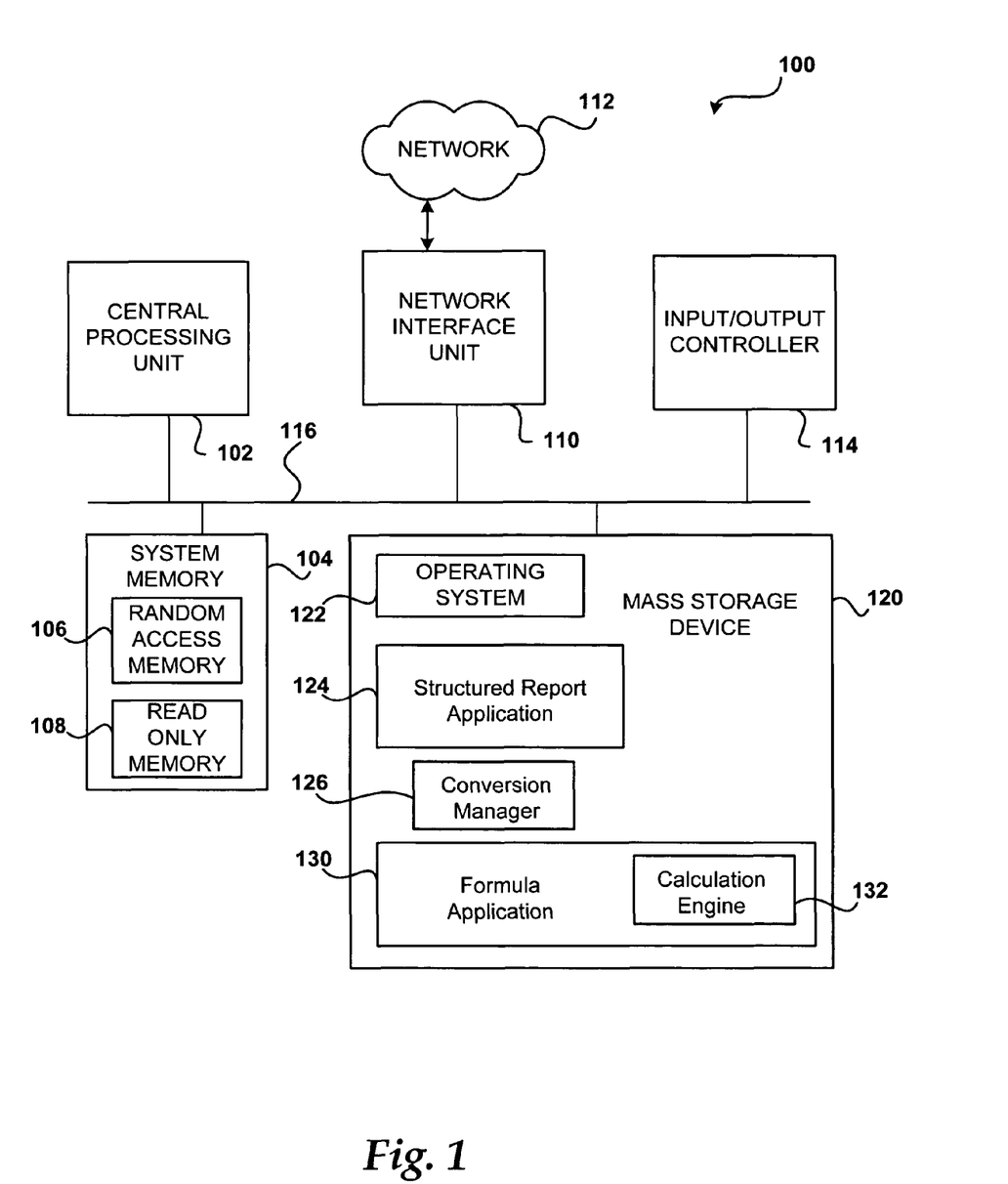
FIG. 1 illustrates an exemplary computing architecture for a computer.

Referring now to FIG. 1, an exemplary computer architecture for a computer 100 utilized in various embodiments will be described. The computer architecture shown in FIG. 1 may be configured in many different ways. For example, the computer may be configured as a server, a personal computer, a mobile computer and the like. As shown, computer 100 includes a central processing unit 102 ("CPU"), a system memory 104, including a random access memory 106 ("RAM") and a read-only memory ("ROM") 108, and a system bus 116 that couples the memory to the CPU 102. A basic input/output system containing the basic routines that help to transfer information between elements within the computer, such as during startup, is stored in the ROM 108. The computer 100 further includes a mass storage device 120 for storing an operating system 122, application programs, and other program modules, which will be described in greater detail below.

The mass storage device 120 is connected to the CPU 102 through a mass storage controller (not shown) connected to the bus 116. The mass storage device 120 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, the computer 100 operates in a networked environment using logical connections to remote computers through a network 112, such as the Internet. The computer 100 may connect to the network 112 through a network interface unit 110 connected to the bus 116. The network interface unit 110 may also be utilized to connect to other types of networks and remote computer systems.

The computer 100 may also include an input/output controller 114 for receiving and processing input from a number of devices, such as: a keyboard, mouse, electronic stylus and the like. Similarly, the input/output controller 114 may provide output to a display screen, a printer, or some other type of device (not shown).

As mentioned briefly above, a number of program modules and data files may be stored in the mass storage device 120 and RAM 106 of the computer 100, including an operating system 122 suitable for controlling the operation of a networked computer, such as: the WINDOWS XP operating system from MICROSOFT CORPORATION; UNIX; LINUX and the like. The mass storage device 120 and RAM 106 may also store one or more program modules. In particular, the mass storage device 120 and the RAM 106 may store a structured report application 124 and formula application 130. In one embodiment, structured report application and 124 and formula application 130 both correspond to a spreadsheet application program, such as the MICROSOFT® EXCEL spreadsheet application. According to one embodiment, the structured report application 124 and formula application 130 are operative to provide functionality for interacting with an OnLine Analytical Processing (OLAP) data store. When structured report application 124 corresponds to a multi-dimensional presentation, the report interacts with the OLAP data store through the use of dimension members, report filters, and values (i.e., measures) included in the presentation. Formula application 130 interacts with the OLAP data store through the use of cube functions that are entered into one or more cells of formula application 130. Both applications (124, 130) may generate one or more requests to fetch data from an OLAP data store identified by the dimension members, cells, and cube functions and populate cells with their associated data.

Both applications (124, 130) are also configured to receive user input. For example, a user enters item data into a structured report (e.g., a multi-dimensional presentation) or a formula presentation (e.g., a spreadsheet) via a graphical user interface. The user input can be item data, item metadata, function information, cube function information, or other data depending on the application. The user input may be direct input created by the user typing, pasting, or other deliberate action entering data into the spreadsheet or indirect input that may be generated by another program.

Calculation engine 132 performs operations relating to the cells within the formula presentation. According to one embodiment, calculation engine 132 is a component within formula application 130. The calculation engine 132, however, may be located externally from the formula application 130. The operations performed by calculation engine 132 may be mathematical, such as summation, division, multiplication, etc., or may include other functions or features, such as interacting with a multi-dimensional (e.g., OLAP) data store. Calculation engine 132 may be configured to perform many different operations.

Also included in mass storage device 120 is conversion manager 126. Conversion manager 126 is configured to convert a structured report (e.g., multi-dimensional presentation) of structured report application 124 into a formula presentation (e.g., spreadsheet) of formula application 130. In one embodiment, conversion manager 126 is included in a spreadsheet application that also provides the functionality for structured report application 124 and formula application 130. Conversion manager 126 converts the cells of the structured report to formulas for inclusion in the formula presentation, as is described in greater detail below.

Throughout the specification and claims, the following terms take the meanings explicitly associated herein, unless the context clearly dictates otherwise.

The term "cube" refers to a structure of the multi-dimensional (e.g., OLAP) database from which data is retrieved. A cube is comprised of dimension members, levels, and measures. The term "member" is a value along one of the cube's dimensions. For example, a member of a Time dimension might be "June 2003". A member of a customers dimension might be "John Doe." The term "structured report" refers to a multi-dimensional presentation of data included in a cube. Structured reports may include PivotTable® style reports developed by the MICROSOFT® CORPORATION, cross tab reports, simple reports, or the like. The term "spreadsheet" refers to a formulaic presentation of data, in contrast to a structured report, and may or may not be representative of the data with a cube. Examples of spreadsheets include spreadsheets of a workbook generated by the MICROSOFT® EXCEL spreadsheet application. The term "cube function" refers to a formula included within a cell that represents data of a cube. The term "MDX" refers to the MultiDimensional eXpressions language for expressing cube functions. The term "MDX Name" is a name as defined by MDX that refers to MDX names and expressions. The term "caption" refers to a non-unique friendly name to be displayed in the spreadsheet. The term "connection" refers to the name of a data connection that has been stored within a spreadsheet file (e.g., workbook). Connection names are strings that uniquely identify connections within the file in which they are used. The term "tuple" corresponds to a combination of "members" or "sets" (see below) in one or more dimensions of a cube that provides a reference within the cube. The MDX Name for a tuple is of the form (<member1>, <member2> ... <memberN>) where each <member> is replaced with the MDX name of that member. When the spreadsheet refers to a range of cells that contain members (or tuples) these ranges are interpreted as tuples. For example, if cells A10 thru A13 of a spreadsheet contain members, then the cube function=CubeValue ("MyConnection", $A10:$A13, D$2) has a tuple as its second argument. The term "set" is an ordered collection of one or more members (or tuples). The term "aggregate" corresponds to a combination of tuples or sets that produces a natural value for the combination. For example, combining (California, Sales) which has a value of $50 and (Texas, Sales) which has a value of $65 produces an aggregate of $115.

Embodiments herein describe converting structured reports to independent cells that contain formulas (that contain cube functions). Once a structured report has been converted to independent cells, the user may change the report layout with all the flexibility provided by the formulaic presentation of the spreadsheet application. For example, the user may insert rows and columns and use copy/paste to move parts of the report around. Accordingly, the benefits of cube functions are provided to a set of data that was initially built as a structured report.

For example, consider a report that shows the top ten customers ranked by sales. A relatively cheap conversion would simply place the members "CustA", "CustB", etc. into consecutive cells using a function. This simple conversion would show the same set of customers, regardless of how sales might change over time. Another conversion, as is described herein, places customers into the cells, such that changes to the underlying data of the cells is reflected within the presentation of the cells.

Figure 2:
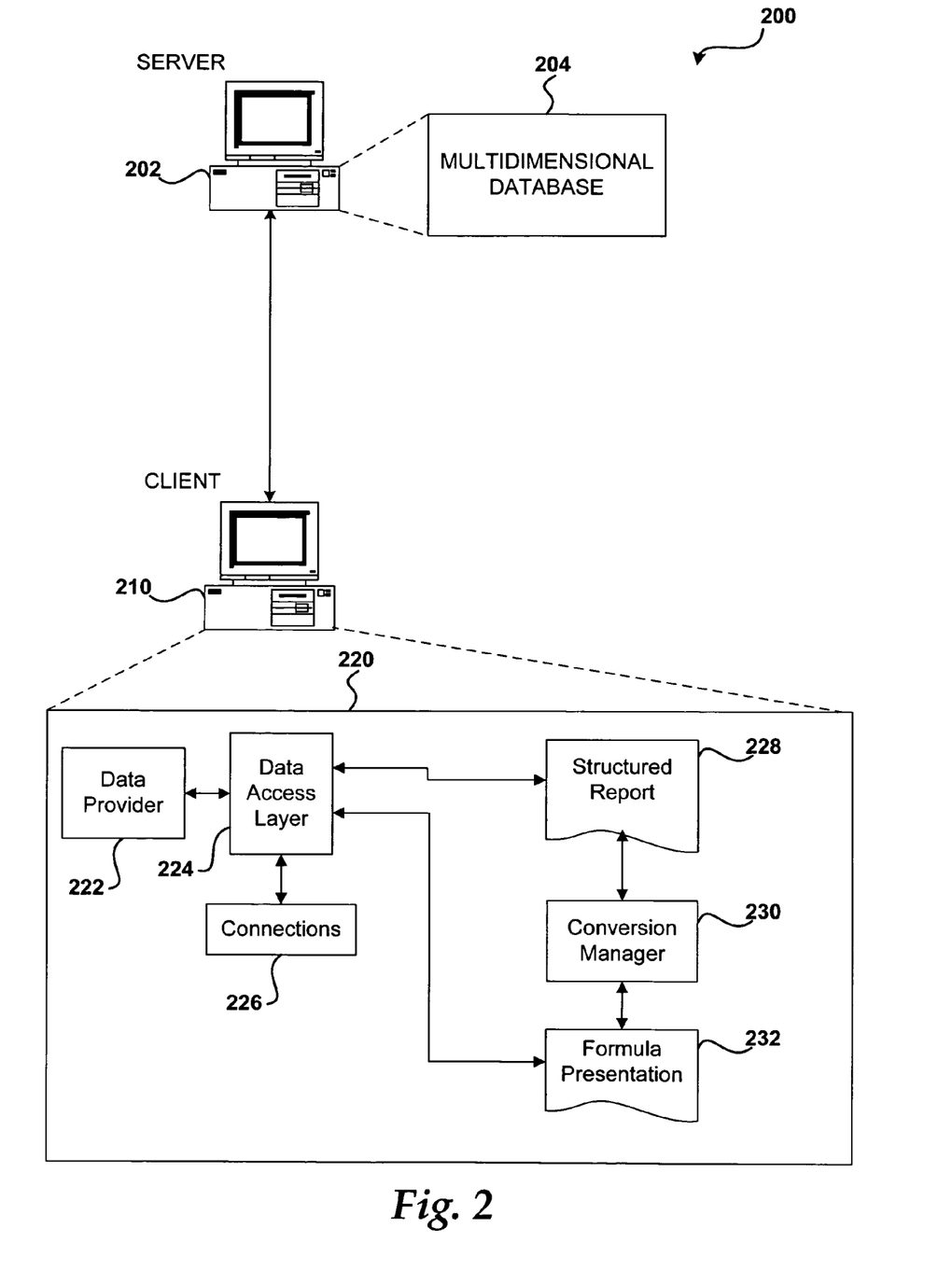
FIG. 2 illustrates an overview of a system for converting a structured report to formulas.

FIG. 2 illustrates an overview of a system 200 for converting structured reports into formulas, in accordance with aspects of the invention. As illustrated, system 200 includes a server 202, which includes and/or is coupled to a multi-dimensional database 204, such as an OLAP data store. Server 202 is coupled to client 210 through a network connection. Client 210 includes a spreadsheet application 220 that, in one embodiment, includes the functionality for structured report application 124, conversion manager 126, and formula application 130 shown in FIG. 1. Spreadsheet application 220 as illustrated in FIG. 2 includes data provider 222, data access layer 224, connections 226, structured report 228, conversion manager 230 and formula presentation 232.

Communication between the spreadsheet application and the OLAP database 204 may be accomplished using MDX. Any other language, however, may be utilized that can communicate with an OLAP database. Furthermore, although the application is described herein as a spreadsheet application, it will be appreciated that other applications, such as word processing applications that include spreadsheet cells, as well as other applications utilizing cells, may utilize the embodiments described herein for converting structured reports into cube functions.

The data from multi-dimensional database 204 is received at client 210 by data provider 222. The data is then propagated through data access layer 224 to the structured report 228 and the formula presentation 232, depending on whether the report or presentation is currently active in the spreadsheet application 220. Connections 226 stores the connection information that links the spreadsheet application 220 to the multi-dimensional database. While spreadsheet application 220 is shown to include data provider 222 and data access layer 224, external applications located on the client 210 may instead provide this functionality.

Figure 3:
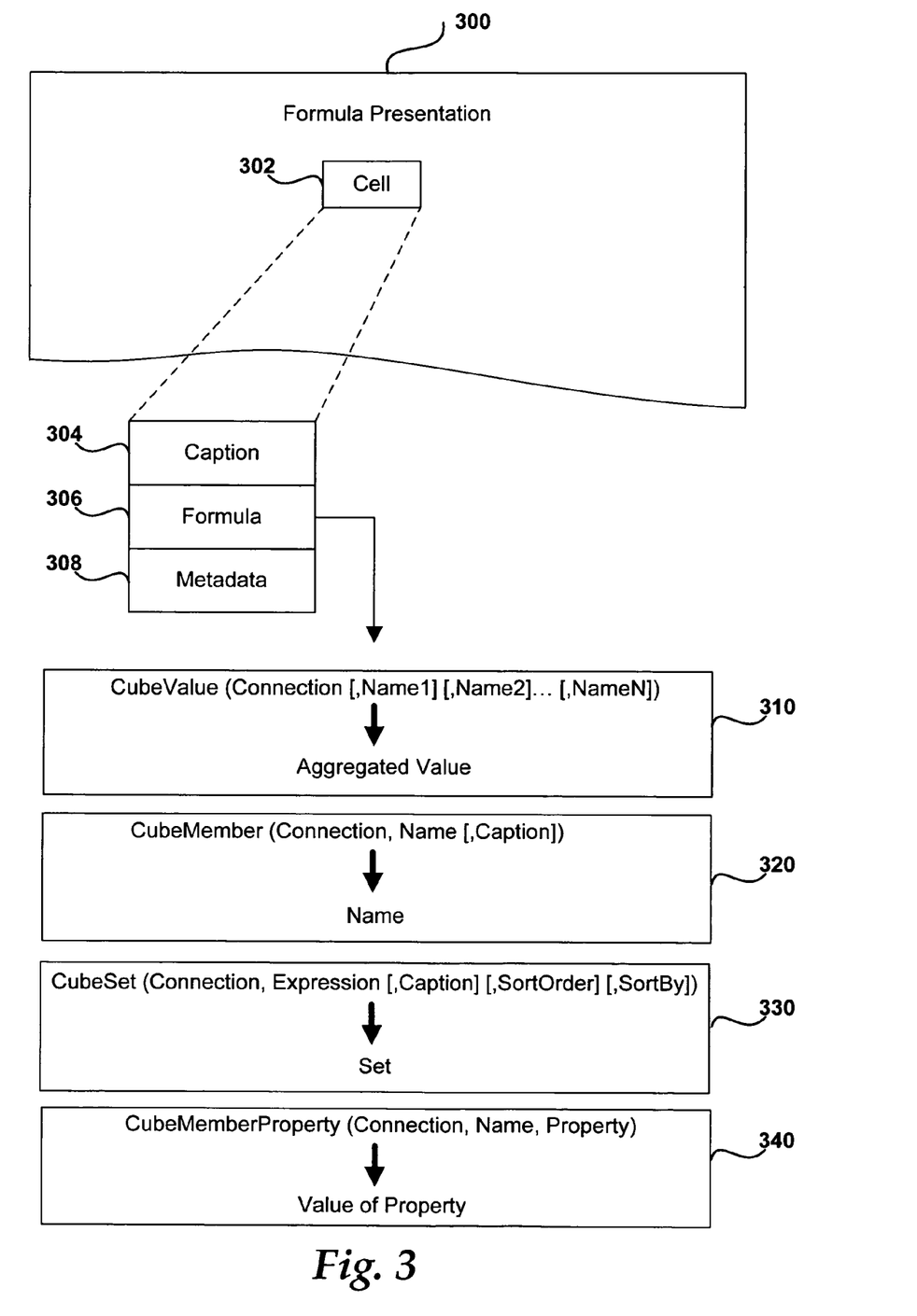
FIG. 3 illustrates an exemplary form of a cell after being translated from a structured report cell to a formula.

FIG. 3 illustrates an exemplary form of a cell after being translated from a structured report cell to a formula, in accordance with aspects of the present invention. In the example shown, formula presentation 300 comprises a number of cells such as cell 302. Cell 302 includes a caption 304, a formula 306, and metadata 308. The caption 304 corresponds to the user interface presentation of the data in response to the formula 306. Certain aspects of the data converted from a structured report, such as the presentation of the data, may be reflected in either the formula 306 or the metadata 308.

The cells within formula presentation 300 that contain cube functions appear to the user to behave as any other cell within the spreadsheet that contains a formula. Generally, formulas within formula presentation 300 can include the following: cube functions as defined herein that directly query an OLAP cube; dependent cube functions that query an OLAP cube but that also require the results of a different query as one of their arguments; standard spreadsheet functions that have a dependency on the values returned by the cube functions; and standard spreadsheet functions that have no dependency. However, in one example, since the structured report from which the formula presentation 300 was created is a cube dependant presentation of data, initially, the cells include cube functions or dependent cube functions.

If each of these cube functions is independently executed within the formula presentation 300 then there may be a large number of small queries against the OLAP server. This could result in diminished performance for the spreadsheet application. According to one embodiment, the queries are combined into fewer queries such that fewer queries are made to the OLAP server.

Cell calculations for the cells (e.g., 302) may be performed asynchronously. In other words, while data is being fetched from the OLAP server the calculations may continue within the other cells. Therefore, the calculations proceed for the cells that have no dependency on the result set, but are delayed for cells that are dependent. If the cell has a dependency on a query, the cell may be filled with a temporary error value of "#GETTING_DATA . . . " and the calculation proceeds to the next cell in the chain. This error shows the user that an action is being performed that relates to the cell.

When all of the cells have been evaluated, the formula presentation 300 triggers the aggregated query(s) needed to obtain data. This query is run asynchronously whenever possible. Asynchronous query processing may be desired so that the query won't block the spreadsheet applications UI thread and users can continue to work with the UI and can even abort the query when it's taking too long.

As illustrated, the formulas used for converting a pivot table to a formulaic cell may include the following cube functions: cube value function 310; cube member function 320; cube set function 330; and cube member property 340.

CubeValue

CubeValue (Connection [, Name1] [, Name2] . . . [, NameN]) function 310 returns an aggregated value from the OLAP cube specified by the connection parameter. The "Name" parameter is an optional parameter that may appear any number of times within the CubeValue function call. For example, one cube value function call may contain only one name, while another cube value function call may contain many names, separated by commas. According to one embodiment, each name is the MDX name of a member or tuple (or tuple) within the cube. Alternatively, the name could be a Set as defined by a CubeSet function as described below. The provided names are used as slicers to define the portion of the cube for which an aggregated value is to be returned.

According to one embodiment, if a Name is not supplied for any particular hierarchy, then the default member for that hierarchy is used. Similarly, when a Name is not supplied for any measure, then the default measure for the cube is used. The Name parameter may also be a cell reference to another cell in the spreadsheet that contains a unique MDX name in the cell's MDX property. Any cells that contain the Cube-Member( ) function evaluate to a caption (e.g., 304) plus a unique MDX name in the cell's MDX property.

Aggregates which may be returned by the CubeValue function represent various "slices" of the cube. An aggregate corresponds to the "aggregate" value from the cube for the specified (slicer) arguments. Aggregates are most often (but not always) sums. For example, the aggregate value for Sales over February and March is the sum of the sales for February and March. But in other cases, the aggregated value can be the last value or an average value (or any other formula that we choose to use when combining data into an aggregated value.) For example, the aggregate value of an account in a general ledger is the balance on the last day of the time period. The balance for February is the balance at the end of that month, but the balance for the aggregated period of May thru July is the balance for the last day in July. An example of when averaging happens would be baseball hitting averages. The aggregated value for a batter for the month of June is that average over that month. The aggregated value for the same batter over an entire season or over a lifetime is the average of the larger period. Aggregation asks for a value where the coordinates are specified along multiple dimensions. For example, we might ask for sales data for a specific time period, a specific set of products, and a specific set of salesmen. The aggregate is the value that is returned from the specified coordinates. CubeValue is the function used to return an aggregate.

According to one embodiment, the tuple associated with any CubeValue is stored. This increases the efficiency to communicate with the OLAP server about the portion of the cube that's associated with the desired value. The following are some illustrative examples of the CubeValue( ) function: CubeValue ("SALES", "[Measures].[Profit]", "[Time].[1999]", "[All Product].[Beverages]"); CubeValue ($A$1, "[Measures].[Profit]", D$12, $A23); and CubeValue ("SALES", $B$7, D$12, $A23).

CubeMember

The CubeMember (Connection, Name [,Caption]) function 320 returns a fully qualified unique MDX member name, or MDX tuple, as well as the user-friendly caption (e.g., 304) for that member. According to one embodiment, when a tuple is returned, the user-friendly caption is the caption of the last member in the tuple. Evaluating this function causes the cell to display the caption, while the cell's MDX property is set to the unique MDX member name or MDX expression for the tuple. The Name parameter is a string containing the MDX member name of a member (or tuple) within the cube and corresponds to the member (or tuple) shown in the corresponding pivot table. The CubeMember function validates that the provided name exists within the cube and then returns the unique member name associated with this member as the MDX property along with that member's caption as the function's value. This argument may also represent a tuple. When the argument is a tuple, the user may specify an array of members using the spreadsheet's array syntax. The name argument may also be a reference to a cell that contains a member, or a cell that contains a string which evaluates to a unique MDX name, or a range of cells which will evaluate to a tuple. The Caption parameter is an optional string to be used as the caption in place of any caption that may be obtained from the cube. This can be used during conversion from a structured report to ensure that the caption matches the caption from the report.

The following are some illustrative examples of the CubeMember( ) function: CubeMember ("conn", "[Customers].[USA]"); and CubeMember ("Finance","[Account].[Accounts].[NetIncome].[Operating Profit].[Gross Margin].[Net Sales].[Gross Sales]").

CubeSet

The CubeSet (Connection, Expression [,Caption] [,Sort Order] [,SortBy]) function 330 defines a set that is to be built for the spreadsheet by the OLAP server. The CubeSet function sends the Expression to the OLAP server defined by the specified Connection. The server then creates a set by evaluating the Expression and returns that set to the spreadsheet program. The spreadsheet then uses the Caption as the function's display value, while also setting the function's MDX (value) metadata to the MDX Expression that was sent to the OLAP server.

The Expression parameter is a string containing any arbitrary MDX expression that can be evaluated by the OLAP server which results in a set of members or a set of tuples. An expression can also be a cell reference to a range that contains one or more cube members or tuples or sets. The Expression argument defines the items that are to be included in the set.

The Caption parameter is the optional string to be used as the caption that describes the set being created according to the corresponding structured report. When the caption is not provided, then the caption is set to a null string.

CubeMemberProperty

The CubeMemberProperty (Connection, Name, Property) function 340 returns the value of a member property in the cube. The Name is the MDX name of a member within the cube or a reference to a cell that contains a member. The CubeMemberProperty function validates that the name exists within the cube and then returns the specified property for this member. The Property is the MDX name of the property to be returned or a reference to a cell that contains the name of the property.

The following are some illustrative examples of the CubeMemberProperty ( ) function: CubeMemberProperty ("Sales", "[Time].[Fiscal].[1999]", $A$3); and CubeMemberProperty ("Sales", "[Store].[MyFavoriteStore]", "[Store].[Store Name].[Store Sqft]").

When the Cube function is CubeMember, CubeValue, or CubeMemberProperty, then the MDX property of the cell provides an MDX expression representing the member or tuple or property defined by the function. For example: Cell C3 contains: =CubeMember ("conn", "[Customers].[USA]"); Cell C4 contains: =CubeValue ("conn", "[Bicycles]", "[WA]"); Range ("C3").MDX=(<unique member name for USA>) as returned by server; and Range ("C4").MDX=(<tuple consisting of unique member names for Bicycles and WA>).

The cube functions listed above are not exhaustive of the set of cube functions that may be used in accordance with the present invention. Other cube functions may be used to represent the structured report cells as they are translated to formulas for inclusion in formulaic cells.

In addition to the use of the cube functions as provided above

Figure 4:
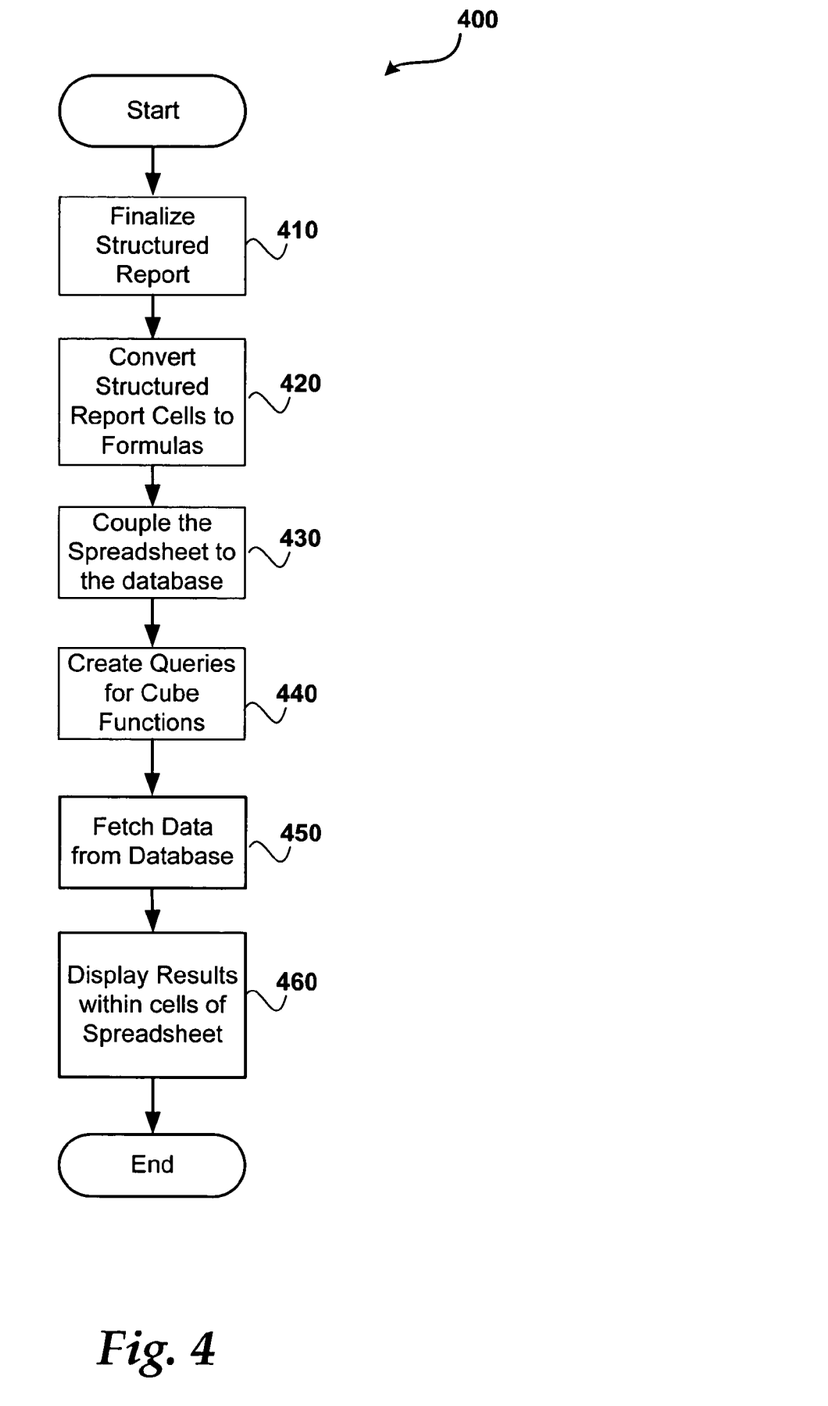
FIG. 4 displays an exemplary operational flow for using cube functions within a spreadsheet.

FIG. 4 displays an exemplary operational flow 400 for converting a structured report to a formulaic spreadsheet, in accordance with aspects of the invention. After a start block, the process flows to finalize operation 410, where the pivot table is finalized. In one embodiment, when converting a structured report to formulas, a refresh of the structured report is performed. This may cause a variety of things to happen, including the launching of a security warning.

Moving to operation 420, the pivot table cells are converted to formulas by converting each cell into a cube function. The cube function used depends on the type of cell included in the structured report. The following discussion describes some of the cell types included for a PivotTable® structured report and their conversion for the MICROSOFT® EXCEL spreadsheet application.

Blank Cells

Blank cells in the PivotTable® structured report (cells whose pivot cell type is xlPivotCellBlankCell) become blank spreadsheet application cells in the spreadsheet.

Data Field Cells

Data field cells in the PivotTable® structured report (cells whose pivot cell type is xlPivotCellDataField) contain the name of one of the measures in the cube. These cells are converted to a CubeMember function that returns the specified measure.

Report Filter Items

Report filter items in the PivotTable® structured report (cells whose pivot cell type is xlPivotCellPageFieldItem) generally represent a member of a hierarchy or multiple members. Within a PivotTable® structured report, these fields frequently have a drop down that shows filtering or selection UI. In one embodiment, once these cells are converted to formulas, the dropdown is no longer available. Report filter items are converted to a CubeSet function.

In one embodiment, when the entire set of members is selected, an expression is used in the CubeSet function, while, when a handful of members are selected, they are enumerated in the CubeSet function. In an additional embodiment, a selection may be made to retain a report filter in its current format. In this instance, the structured report is partially converted. Accordingly, the spreadsheet, where the structured report used to display row headers, column headers, or data values includes cells that contain formulas. Where there used to be report filters, there are still report filters. The report filters that remain correspond to a structured report from which everything has been removed from rows, from columns and from the data area. The structured report has a similar name, uses a similar connection, and has similar properties. Metadata stored corresponding to the report filter allows cube functions of the spreadsheet to refer to the report filter as another dimension for the data.

Pivot Fields

Pivot fields in the PivotTable® structured report (cells whose pivot cell type is xlPivotCellPivotField or xlPivotCellDataPivotField) may include a name of a level (either a level in the cube's hierarchy or a custom group level), a name of a member property, a string "Data" (this is a special instance known the Data Pivot Field), or a string "Filter Rows".

In most (but not all) cases, the pivot fields in the PivotTable® structured report have a gray background. In some cases the cell formatting is kept when converted to spreadsheet data through the use of the cell metadata. In other cases they are not. The pivot fields are converted to simple strings with backgrounds that match the cell from which they are being converted. The converted cell appears similar to it did in the pivot table with the same cell formatting if the formatting is kept. In some embodiments, these fields may have a drop down that shows filtering or selection UI. Once these cells are converted to sheet data formulas, that dropdown is no longer available.

In one embodiment, the PivotTable® structured report may include a compact axis. In the case of compact axis, the cell contains a tuple while displaying a caption for one of the members in that tuple. There may also be some indentation. Consider this example where column A of the spreadsheet contains the following compact axis:

Canada
Mexico
USA
   OR
   WA
      Beverage
      Food
      Other The cell containing Food is converted to a CubeMember function for the tuple consisting of ([Customer].[USA].[WA], [Product].[Food]). In this case, the CubeMember function displays the caption for the last item in the tuple ("Food") and the appropriate indentation is applied, resulting in the same appearance existed in the pivot table.

When there are multiple dimensions on an axis, members of the innermost dimension on the axis are represented by tuples that include the outer dimensions. By placing a tuple in the innermost row/column, the data area needs only to refer to those tuples to get the appropriate slicers of the data.

Total Cells

Grand total and subtotal cells in the PivotTable® structured report (cells whose pivot cell type is xlPivotCellSubtotal or of type xlPivotCellGrandTotal) are converted to CubeSet or CubeMember functions.

Value Cells

Value cells in the PivotTable®) structured report (cells whose pivot cell type is xlPivotCellValue) are converted to a CubeValue function. When converting, to get the right cell references for the slicer arguments, the Value cells are converted last. The algorithm that's described here assumes that the rest of the pivot table has already been converted to cube functions, but this is assumption is not necessary for operation of the present invention. For each value cell, the cells above and to the left are examined looking for cells that contain members that are slicers for the value desired. Note that the innermost items contain tuples that may be referenced. By referencing the innermost items (when there are multiple dimensions) members from other dimensions that are outside the slicers being referenced may be ignored.

When looking above and to the left of a particular cell often encounters a blank cell. (Example: Total rows where multiple dimensions are on an axis.) When a blank cell is encountered, examination continues above or to the left of that cell to find the value to be referenced.

Cell references are used in the CubeValue function instead of using member names directly in the arguments. Using cell references enables the user to change the row or column header or filter and still have accurate values in the data section of the grid.

The present invention is not limited to the above conversion heuristics described, which are presented by way of example only. The above heuristics are merely representative of some of the heuristics used when converting a MICROSOFT® EXCEL PivotTable® structured report to a MICROSOFT® EXCEL spreadsheet. Other heuristics may be used, and other application may apply different heuristics to achieve a similar result.

Flowing to operation 430, the spreadsheet is coupled to the database corresponding to the structured report. When the spreadsheet is created and particular cells are defined within the spreadsheet to include cube functions, different databases may be linked to the information in that cell and/or spreadsheet just as different databases may be linked to different structured reports. In this way, each cell containing a cube function may fetch data from the appropriate OLAP data store.

Transitioning to operation 440, queries are created for the cube functions within the cells of the spreadsheet. According to one embodiment, the queries are in the form of MDX queries.

Moving to operation 450, the queries are used to fetch the data relating to the cube functions from one or more multidimensional data stores. The cells within the spreadsheet may then be populated with the fetched data.

At operation 460, the results of the queries and any calculations that were performed may be displayed to the user. The process then moves to an end block and returns to processing other actions.

In another embodiment of the exemplary operation flow 400, styles that may have been applied to a structured report may be removed when converting to formulas. For example, Auto-Format that may have been applied to the structured report may include both layout and formatting. In one embodiment, any layout that was applied by the auto-format is retained, but any formatting that was applied by the auto-format is removed when converting to formulas. Similarly, when conditional formatting exists for the structured report, the equivalent cell based conditional formatting is applied to the cells that are created by the conversion. In one embodiment, the conditional formatting is applied as metadata of the cell.

Figure 5:
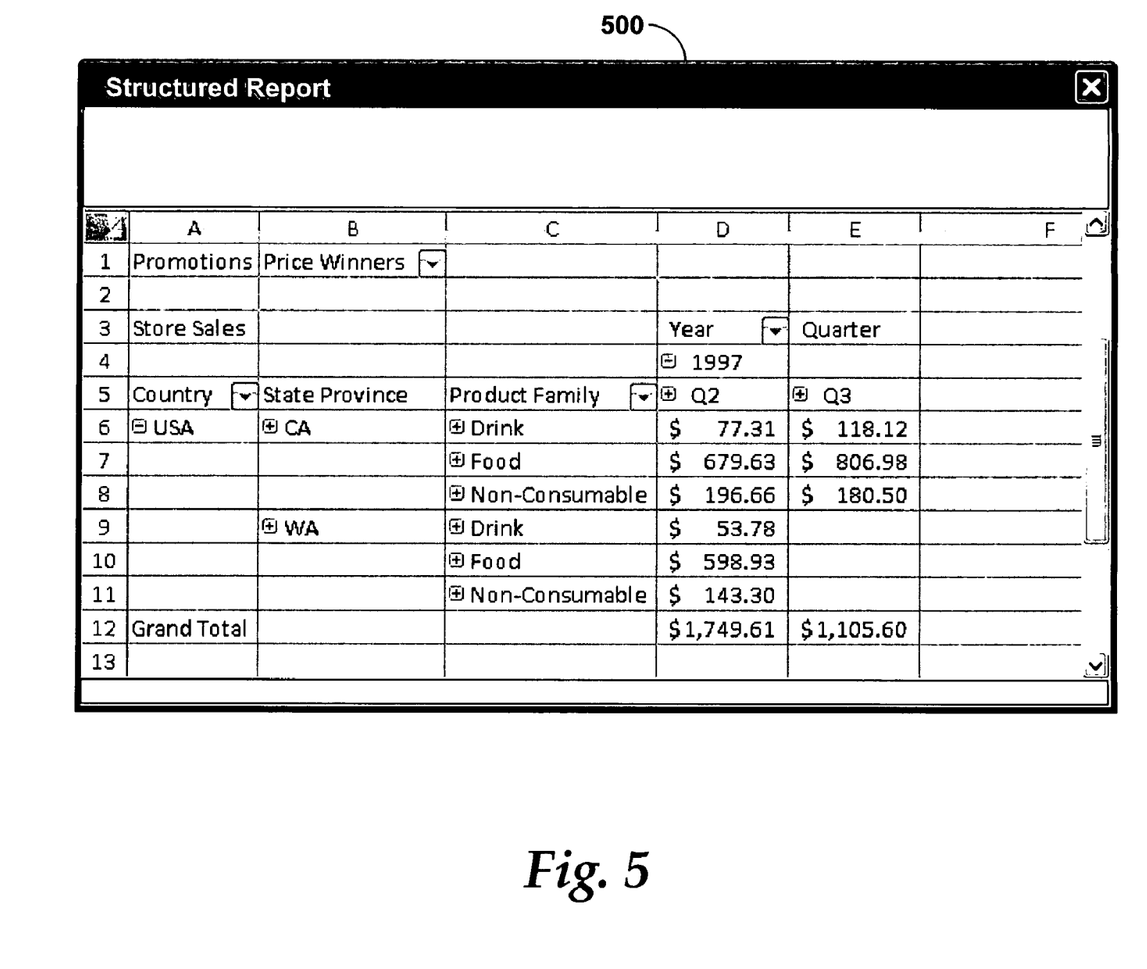
FIGS. 5, 6, and 7 show an exemplary structured report and resulting spreadsheet that includes cube functions before evaluation and after evaluation, in accordance with aspects of the present invention.
Figure 6:
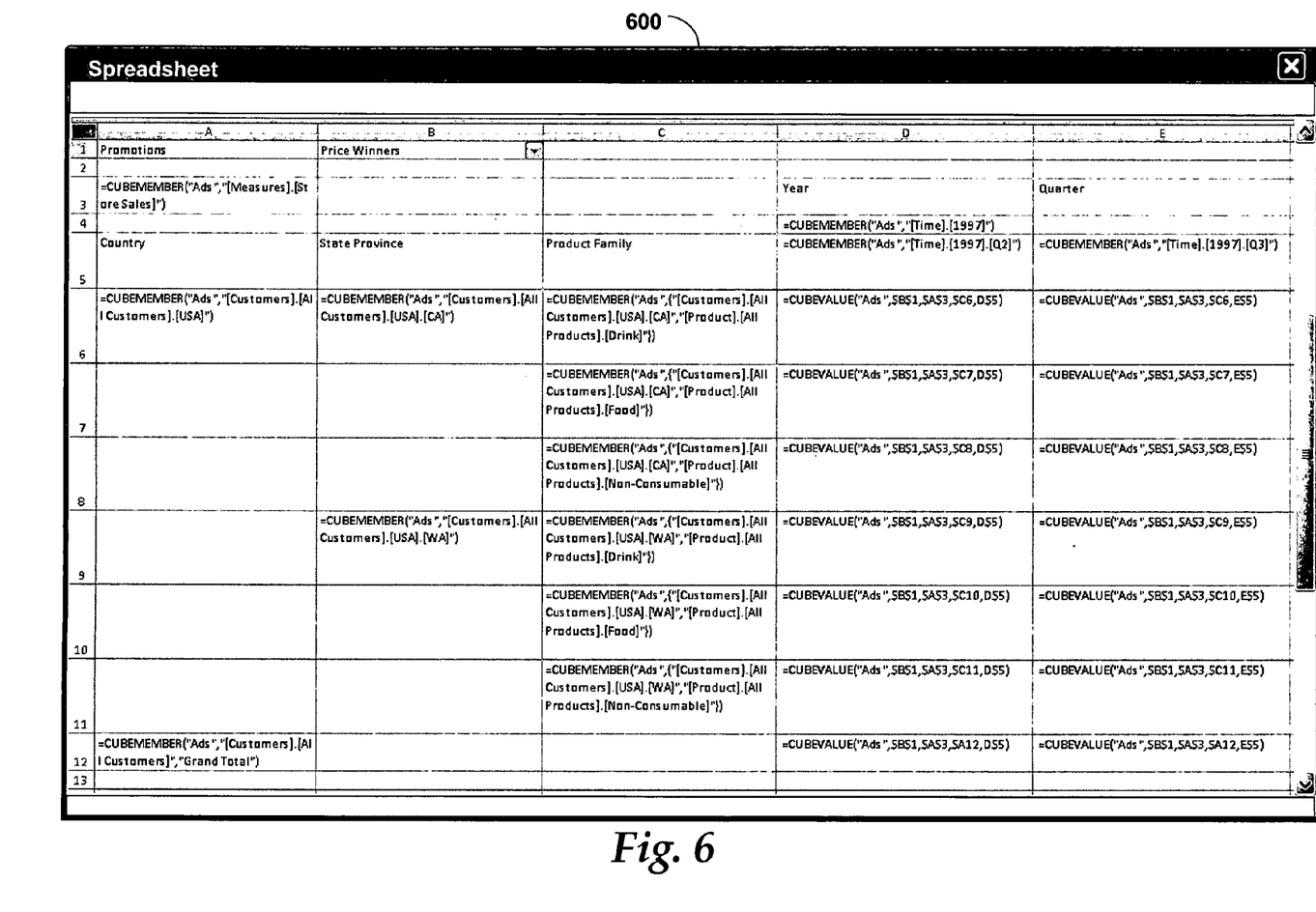
Figure 7:
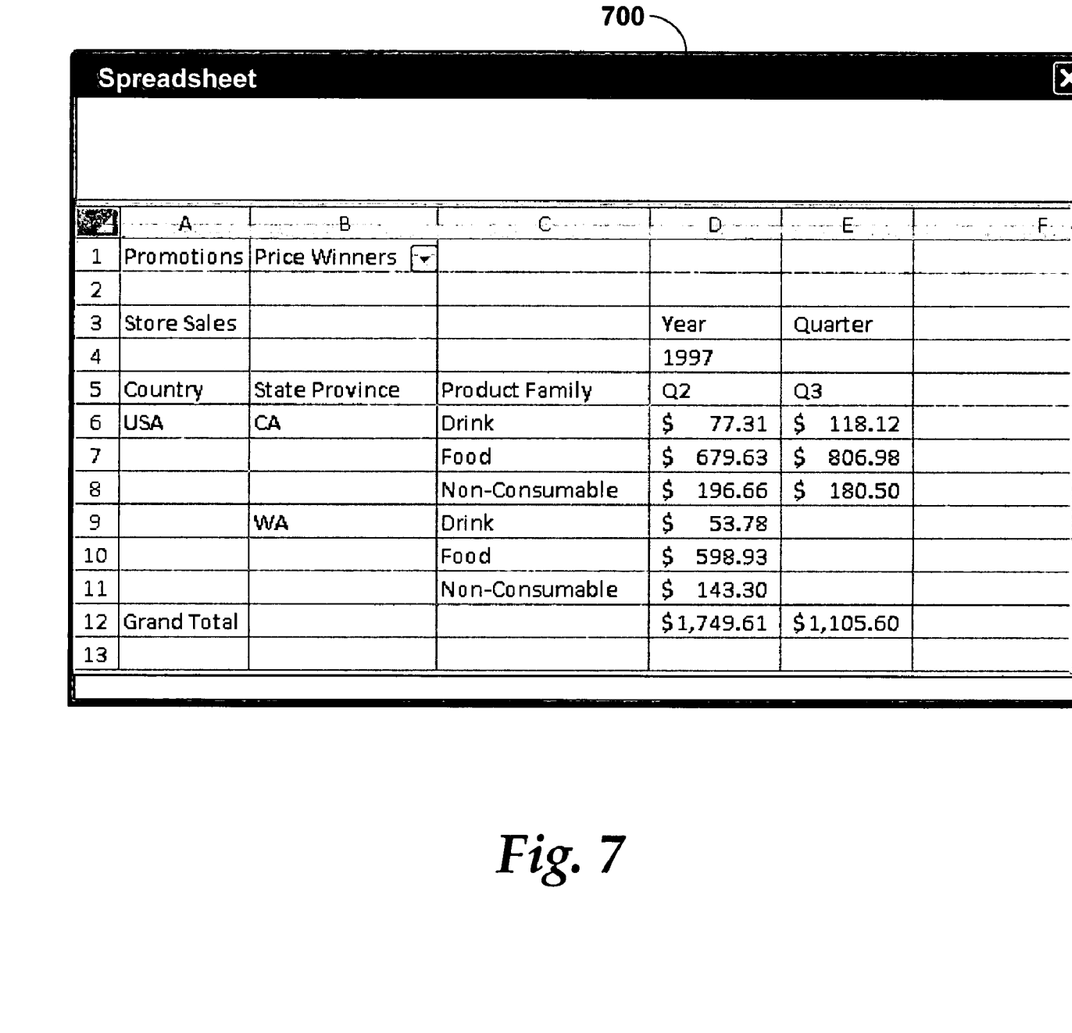

FIGS. 5, 6, and 7 show a simplified exemplary structured report (500) and spreadsheet that includes cube functions before evaluation (600) and after evaluation (700), in accordance with aspects of the invention. FIG. 5 shows the original structured report. FIG. 6 shows the cube function text within the cells. FIG. 7 shows the result of calculating the cube functions. The visual aspect of spreadsheet 600 has been changed in FIG. 6 to illustrate the full text of each of the cells.

As illustrated, each cell within spreadsheet 600 and 700 includes a cube function that corresponds to the data of structured report 500. Including a cube function within each cell of the spreadsheet is merely for illustrative purposes. The spreadsheet may have zero or more cube functions contained within the cells. For example, a spreadsheet may include only a single cube function to obtain a single value from an OLAP cube. Furthermore, the cube functions shown have been simplified for ease of reference and are not purported to be the full cube functions necessary for implementation of the conversion shown.

Referring to a few of the cells within spreadsheet 600 it can be seen that cell D6 includes a CubeValue function that refers to its immediate adjacent left and above CubeMember cells. Cell D6 is able to refer to its immediate CubeMember cells because of the tuple generated in cell C6. Also, in the example shown, the report filter corresponding to the promotion type (i.e., best savings) is kept as a report filter of a structured report, rather than converting the report filter to a cube function. Accordingly, the dropdown functionality of the report filter is retained. Each CubeValue function is able to refer to the report filter as if the report filter included a cube function due to the metadata of the report filter. The metadata provides sufficient information to direct the cube functions that refer to it to the correct dimension in the OLAP database. Since the data cells reference other cells for their values, as the spreadsheet is edited and changed, or cells are moved, the data in the cells is updated to reflect the changes.

Using cube functions within the spreadsheet allows the users to insert and/or delete rows and columns without interfering with the data's ability to be refreshed. Using these functions also provides some advantages over structured reports in that the user has complete flexibility in how they design their report. The functions by themselves have some disadvantages vs. structured reports in that they aren't as easy to create because they don't have a field list from which fields can be selected. Structured reports also provide expand/collapse behavior that makes it incredibly easy to add members from an OLAP cube to a report. The present invention provides the best of both worlds by permitting users to initially build their report using a structured report and then converting that structured report to a set of formulas that comprise one or more cube functions. The user can use the structured report's field list to choose the categories of data to be included in the report, and then the user can use other structured report interactivity (pivoting, expand/collapse, etc.) to specify precisely what information should be in the report. Then the user can convert the structured report to formulas and move the formulas around in the spreadsheet resulting in any custom layout the user desires. Because the data is no longer in a structured report, it is no longer subject to the layout restrictions of structured reports.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for converting a structured report having cells into formulas, comprising:
    automatically converting each of the cells of the structured report into formulas for a spreadsheet including formulaic cells, comprising: converting dimension members included in the structured report into formulas of a first type; wherein dimension members act as indices for identifying a particular cell or range of cells within a multi-dimensional array; wherein the structured report is a multi-dimensional presentation of data that is included within a multi-dimensional database; wherein the structured report has layout restrictions that restrict inserting rows and columns into the structured report; wherein the structure report is created before the data is added to the structured report; wherein each formula is selected from a set of cube functions based on a type of cell of the structured report; wherein when the type of cell in the structured report is a report filter type, a selection user interface that is displayed within the structured report for filtering at least one value that is displayed within the structured report is not displayed within the spreadsheet after the cell is converted; automatically converting each of the measures included in the structured report into formulas of a second type, wherein formulas of the second type depend on calculation of the formulas of the first type;
    placing the formulas of the first type and the formulas of the second type in the formulaic cells of the spreadsheet; wherein all of the formulas within the cells are movable within the spreadsheet without the layout restrictions of the structured report; wherein the formulas placed within the formulaic cells comprise at least one cube function selected from: a cube value function that returns an aggregated value from the multi-dimensional database; a cube member function that returns a user-friendly caption for a member and at least one of a fully qualified unique MultiDimensional eXpressions ("MDX") member name and an MDX tuple; a cube set function that defines a set that is to be built for the spreadsheet; and a cube member property that returns a value of a member property in the multi-dimensional database; and
    executing the formulas including the at least one cube function in the formulaic cells of the spreadsheet to directly retrieve data from the multidimensional database.

2. The computer-implemented method of claim 1, wherein the first type of formula is arranged to obtain at least one of the following from the multi-dimensional database associated with the structured report: a cube member that identifies an item in the multi-dimensional database; a cube set that identifies items in the multi-dimensional database; and a member property that identifies a value of a member property in the multi-dimensional database.

3. The computer-implemented method of claim 1, wherein the second type of formula is arranged to obtain at least one of the following from the multi-dimensional database associated with the structured report: a cube value; and a cube set; and a member property.

4. The computer-implemented method of claim 1, further comprising providing a formula presentation, wherein the formula presentation provides a display of data retrieved from a multi-dimensional database in response to execution of the formulas.

5. The computer-implemented method of claim 4, wherein obtaining the data from the multi-dimensional database comprises querying for the data in the multi-dimensional database based on the type and arguments of the formula provided.

6. The computer-implemented method of claim 4, wherein metadata associated with each cell of the formula presentation is arranged to provide similar formatting of the data as was provided for that data by the structured report.

7. The computer-implemented method of claim 4, wherein formulas of the first type include a caption that is displayed in the formula presentation in place of data retrieved from the multi-dimensional database.

8. The computer-implemented method of claim 1, wherein a formula of the first type includes a tuple when additional dimensions are included in the structured report in at least one of a left and upward direction from the formula.

9. A system for converting a structured report into a spreadsheet, comprising:
    a processor and a computer-readable storage medium;
    functionality for presenting a structured report and spreadsheet and is configured to perform steps, comprising:
    finalizing the structured report; wherein finalizing the structured report includes choosing categories of data to be included in the structured report, wherein the structured report is a multi-dimensional presentation of data; wherein the structured report has layout restrictions that restrict inserting rows and columns into the structured report;
    automatically converting each of the cells of the structured report into formulas for inclusion in the formulaic cells of the spreadsheet, wherein the formulas are arranged so that when value data of an underlying multi-dimensional database is changed, formulaic cells of the spreadsheet are updated to reflect the changes; and wherein the formulas are automatically placed into the formulaic cells of the spreadsheet; wherein each formula is selected from a set of cube functions based on a type of cell of the structured report; wherein when the type of cell in the structured report is a report filter type, a selection user interface that is displayed within the structured report is not displayed within spreadsheet after the cell is converted;

coupling the spreadsheet to the multi-dimensional database according to a property of at least one of the formulas;

creating queries for data in the multi-dimensional database based on the formulas;

fetching the data from the multi-dimensional database directly using the queries placed into the formulaic cells of the spreadsheet; and displaying the results within the formulaic cells of the spreadsheet such that the display of the spreadsheet is similar to the display of the structured report.

10. The system of claim 9, wherein converting the cells of the structured report into formulas further comprises referencing the formulaic cells of the spreadsheet corresponding to dimensions of the structured report with the formulas in the formulaic cells of the spreadsheet corresponding to values of the structured report.

11. A computer-readable storage medium having stored thereon instructions for converting a structured report having cells to a spreadsheet that includes formulaic cells, comprising:

automatically converting each of the cells the structured report into formulas for a spreadsheet including formulaic cells, comprising: automatically converting dimension members included in the structured report into formulas of a first type; wherein dimension members act as indices for identifying a particular cell or range of cells within a multi-dimensional array; wherein the structured report is a multi-dimensional presentation of data that is included within a multi-dimensional database; wherein the structured report has layout restrictions that restrict inserting rows and columns into the structured report; wherein the structure report is created before the data is added to the structured report; wherein each formula is selected from a set of cube functions based on a type of cell of the structured report; wherein when the type of cell in the structured report is a report filter type, a selection user interface that is displayed within the structured report is not displayed within spreadsheet after the cell is converted;

automatically converting measures included in the structured report into formulas of a second type, wherein formulas of the second type depend on calculation of the formulas of the first type, automatically placing the formulas of the first type and the formulas of the second type in the formulaic cells of the spreadsheet; wherein each of the formulas within the cells are movable within the spreadsheet without the layout restrictions of the structured report;

placing the formulas of the first type and the formulas of the second type in the formulaic cells of the spreadsheet; wherein all of the formulas within the cells are movable within the spreadsheet without the layout restrictions of the structured report; wherein the formulas placed within the formulaic cells comprise at least one cube function selected from: a cube value function that returns an aggregated value from the multi-dimensional database; a cube member function that returns a user-friendly caption for a member and at least one of a fully qualified unique MDX member name and an MDX tuple; and a cube set function that defines a set that is to be built for the spreadsheet; and a cube member property that returns a value of a member property in the multi-dimensional database; and executing the formulas including the at least one cube function in the formulaic cells of the spreadsheet to directly retrieve data from the multidimensional database.

12. A computer-readable storage medium having computer-executable instructions for converting a structured report to a spreadsheet that includes formulaic cells, comprising:

accessing a structured report having dimension member cells and value cells; wherein the structured report is a multi-dimensional presentation of data; wherein the structured report has layout restrictions that restrict inserting rows and columns into the structured report;

automatically converting each of the dimension member cells of the structured report to member formulas, wherein each of the member formulas are placed in the formulaic cells of the spreadsheet that correspond to the associated dimension member cells of the structured report;

automatically converting each of the value cells of the structured report to value formulas, wherein each of the value formulas are placed in the formulaic cells of the spreadsheet that correspond to the associated value cells of the structured report; wherein each formula is selected from a set of cube functions based on a type of cell of the structured report including a report filter type that comprises a selection user interface that is displayed within the structured report for filtering at least one value that is displayed within the structured report; and arranging the value formulas to reference the member formulas such that when underlying data of a multi-dimensional database that is linked to the structured report and spreadsheet is changed, values in the formulaic cells correspond to the value formulas are updated to reflect the changes; and executing the formulas in the formulaic cells of the spreadsheet to directly retrieve data from the multidimensional database.

13. The computer-readable storage medium of claim 12, wherein set formulas are created to identify at least one of a set of members from within the multi-dimensional database and a set of tuples from within the multi-dimensional database.

14. The computer-readable storage medium of claim 12, wherein a compact axis included in the structured report is represented by a member formula that includes a tuple while displaying a caption for a member in that tuple.

15. The computer-readable storage medium of claim 12, wherein the member formulas and value formulas are comprised of a set of cube functions including at least one of the following: a cube value function; a cube member function; a cube set function; and a member property function.

* * * * *